(12) United States Patent
Wang et al.

(10) Patent No.: US 11,675,745 B2
(45) Date of Patent: Jun. 13, 2023

(54) SCALABLE I/O OPERATIONS ON A LOG-STRUCTURED MERGE (LSM) TREE

(71) Applicant: VMware, Inc., Palo Alto, CA (US)

(72) Inventors: Wenguang Wang, Santa Clara, CA (US); Junlong Gao, Mountain View, CA (US); Vamsi Gunturu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 351 days.

(21) Appl. No.: 17/097,473

(22) Filed: Nov. 13, 2020

(65) Prior Publication Data

US 2022/0156231 A1 May 19, 2022

(51) Int. Cl.
| | | |
|---|---|---|
| *G06F 16/18* | (2019.01) | |
| *G06F 16/188* | (2019.01) | |
| *G06F 16/182* | (2019.01) | |
| *G06F 16/901* | (2019.01) | |
| *G06F 9/455* | (2018.01) | |
| *G06F 11/14* | (2006.01) | |
| *G06F 16/16* | (2019.01) | |

(52) U.S. Cl.
CPC ...... *G06F 16/1805* (2019.01); *G06F 9/45558* (2013.01); *G06F 11/1484* (2013.01); *G06F 16/164* (2019.01); *G06F 16/188* (2019.01); *G06F 16/1824* (2019.01); *G06F 16/9027* (2019.01); *G06F 2009/45591* (2013.01)

(58) Field of Classification Search
CPC . G06F 16/1805; G06F 16/164; G06F 16/1824
See application file for complete search history.

(56) References Cited

U.S. PATENT DOCUMENTS

2018/0107402 A1* 4/2018 Pogosyan ............ G06F 11/1448
2021/0374157 A1* 12/2021 Reddy ................... G06F 16/275

* cited by examiner

*Primary Examiner* — Log Tran
(74) *Attorney, Agent, or Firm* — Dinsmore & Shohl LLP

(57) ABSTRACT

A method for managing data associated with objects stored in a cloud storage is provided. The method receives, at a first compute node, first data associated with an object stored in the cloud storage, the first compute node being one of a plurality of compute nodes that store data associated with different objects as storage objects in a log-structured merging (LSM) tree data structure. The method then assigns a first unique name to a first storage object associated with the first data, the first unique name comprising a combination of at least an identifier identifying the first compute node and a first incremental local value. The method stores the first storage object in a first level (L0) of the LSM tree data structure.

18 Claims, 10 Drawing Sheets

SCALABLE I/O OPERATIONS ON A LOG-STRUCTURED MERGE (LSM) TREE

BACKGROUND

The amount of data worldwide grows each year, thus requiring more storage resources. Further, protecting the already stored data (e.g., in a datacenter) against disastrous events, such as storage failure or cyber-attacks, which can completely disrupt the business operations, is essential for every enterprise. An enterprise needs to back up the data stored in its primary data storage(s) at some other storage devices (e.g., in the cloud) so that when the original data is damaged or lost, the backed up data can be restored (e.g., through a disaster recovery process) and used. As such, it is increasingly important to store backup data (e.g., related with virtual machines (VMs) or other types of virtual computing instances (VCIs) of a primary datacenter) in one or more other (e.g., remote) data storages, such as with low cost and high efficiency, such that in case of a disaster, a data recovery system (e.g., a secondary datacenter) can restore the backed up data and run (e.g., the virtual machines of the primary datacenter) in the shortest possible time.

Certain modern databases often use the write-optimized Log Structured Merge (LSM) tree data structure as the main indexing structure to organize on-disk data. The LSM tree is an immutable data structure, which means that new data is written to the LSM tree sequentially. As a result, storing data using an LSM tree data structure significantly reduces write amplification, such as in situations where the storage system that is used to store the data does not allow for data overwrites. Examples of datastores that do not allow for data overwrites include the Amazon Simple Storage Service (S3), which is a cloud computing web service that provides an object store through web services interfaces. Therefore, to achieve high efficiency and low cost, storing objects (or files) and metadata associated with the objects in a datastore that has minimum write amplification, such as Amazon S3 datastore, using an LSM tree may be highly desirable. As the amount of data stored in the datastore grows, a single compute node, however, may not be able to handle all the input/output (I/O) operations on an LSM tree data structure.

To address the above-mentioned problem, existing scale-out solutions may leverage a shared nothing architecture in combination with the LSM tree. However, this architecture has several shortcomings. For example, it often needs multiple (e.g., three) copies of the LSM-tree to allow for high availability which may result in requiring additional space and slowing down the I/O operations (e.g., because all copies must be updated). It also requires additional operations, such as synchronization, logging, and failure recovery to be performed to keep all copies of the LSM tree consistent and up-to-date.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
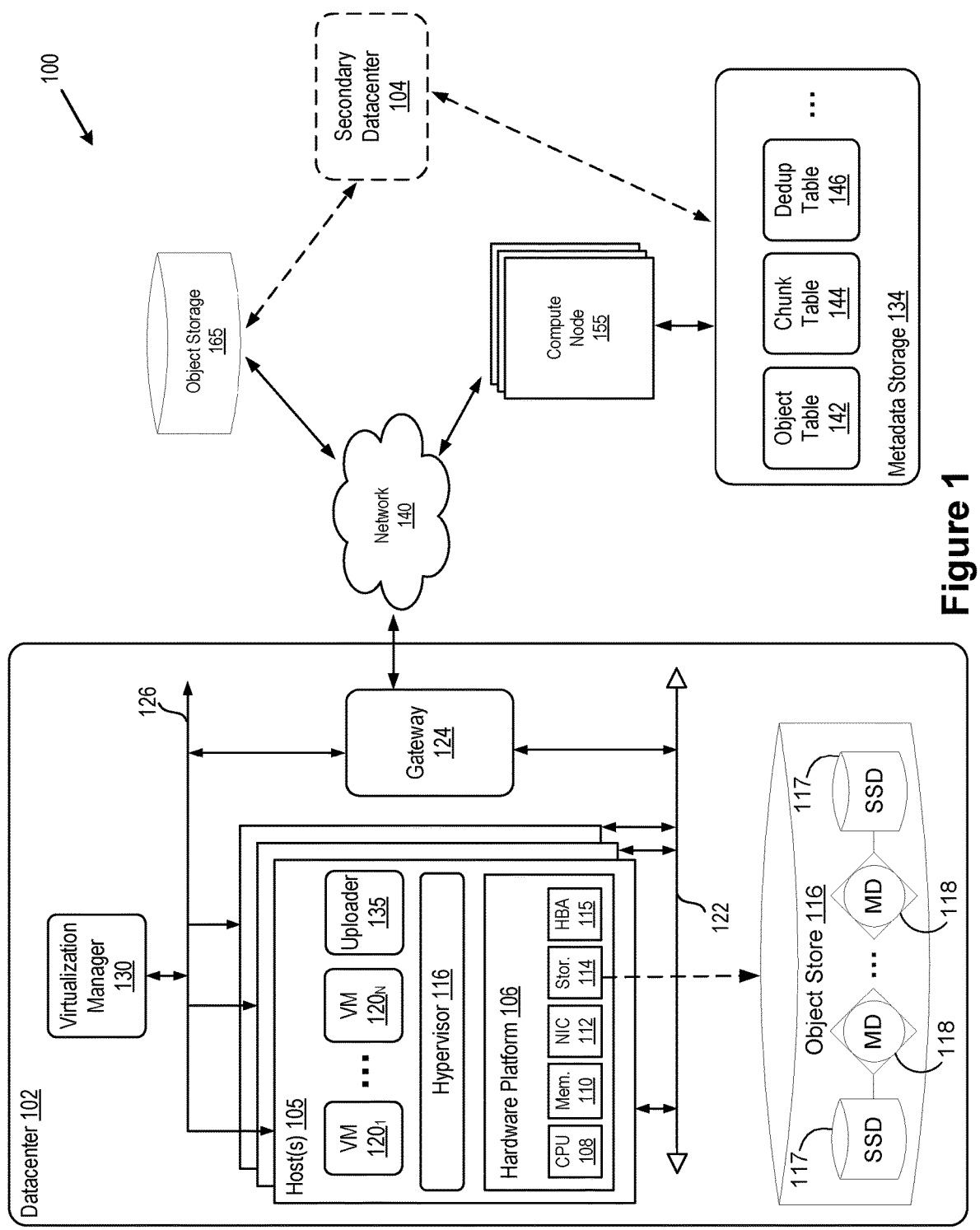
FIG. 1 is a block diagram illustrating a computer system in which one or more embodiments of the present application may be utilized.

As described, writing data to an LSM tree data structure sequentially may result in significant reduction in write amplifications. Write amplification may refer to a ratio of the size of the actual data written to storage versus the size of the data that is requested by a write operation to be written to the storage. For example, in storage systems where old files are not allowed to be overwritten, an update to a single 4 kilobyte (KB) data block of an old 64 megabyte (MB) file results in a whole new 64 MB file being written to storage, where the new file is an exact copy of the old file except for the updated data block. As a result, a 4 KB write is amplified to a 64 MB write. In contrast, with an LSM tree, as further described below, only the new 4 KB data block is written. The new 4 KB is written to a new file and has a key that is the same as the key of the old 4 KB data block in the old file.

An LSM tree includes multiple levels (or layers) of sorted data, where each level has a storage limit (e.g., predefined, configurable, etc.) or threshold that may include a certain amount of data or a certain number of files. Each level of an LSM tree stores a set of one or more tables (e.g., sorted string tables, or SSTables) with each table having a set of one or more key-value pairs. As the level number increases, the number of tables held per level in an LSM tree may increase significantly (e.g., exponentially) in order to limit the overall depth of the LSM Tree. Because new received data is continuously added to the LSM tree, it may periodically become out of shape. An LSM tree is considered to be out of shape when, for example, the amount of data or the number of files stored in any of its different layers reaches or exceeds its corresponding threshold. In such a case, a process called compaction may be invoked to compact the LSM tree and reclaim space. For example, a merging entity (or compactor) may move the tables stored in a first layer, the size of which has surpassed its threshold, to a second layer below the first layer by merging the tables of the first layer with other tables stored in the second layer, while ensuring that the merged data is ordered or sorted. This way, new space becomes available in the first layer for storing additional data.

In some embodiments, except for the first level (L0) of an LSM tree, the SSTables of all other levels below (e.g., L1, L2, etc.) are ordered or sorted (e.g., based on their corresponding keys). L0 may include different SSTables with overlapping (or redundant) keys since new data is continuously and sequentially is added to this layer of the LSM tree. Conventionally, only one writer (e.g., a physical server, a virtual machine, etc.) may write new data to the LSM tree, for example, by writing data sequentially to the first level. If there is more than one writer, each writer may overwrite the data written by another writer (e.g., when two writers write two key-value pairs that share the same key to the LSM tree) which may render unwanted results.

Accordingly, the present disclosure provides techniques for storing data on a highly scalable LSM tree data structure which allows multiple readers and writers to perform I/O operations on the tree data structure. The data may include backup data related to objects of a datacenter, such as virtual machines or other types of virtual computing instances that are stored in a remote object storage (e.g., in the cloud). The techniques may include storing the objects separately from metadata that defines the objects using a plurality of compute nodes (e.g., host machines, VCIs running on the host machines, etc.) to allow for scalable I/O operations.

In some embodiments, an uploader manager residing in each host machine of a datacenter (e.g., an agent executing in the hypervisor of the host machine, a VCI, such as a VM, a container, or any other user space instance running on the host machine) may receive the data stored in a data storage of the datacenter and store it (e.g., as backup data) in an object storage in the cloud. The data, as described, may relate to datacenter objects (e.g., VMDKs, or other objects associated with the client VMs executing in the datacenter). The uploader manager may also transmit information associated with the objects to a plurality of compute nodes to create, store, and manage metadata associated with the backup data. The metadata may include, but is not limited to, objects identifiers (IDs), logical block addresses where each object is stored, a hash of each block, chunk IDs and their corresponding offsets, etc. The compute nodes may store the metadata in a metadata storage separate from the object storage. In some embodiments, a log-structured file system (LFS) data structure may be used to store the object data and an LSM tree data structure may be used to store and manage the metadata. In some embodiments, a cloud storage (e.g., Amazon S3) may be used to store both the object LFS data structure and the metadata LSM tree data structure.

As discussed, the metadata may include a plurality of key-value tables stored as SSTables in the LSM tree data structure in some embodiments. To avoid overwriting the data, and to enable the compute nodes to perform I/O operations independent of each other, each compute node may be assigned a different range of keys to write in the LSM tree. Additionally, each compute node may assign a unique name to the SSTables it stores in the LSM tree, such that during a compaction process of the tree, SSTables that are written by each compute node may be merged together and separate from the SSTables that are written by the other compute nodes.

In some embodiments, the unique name assigned to each SSTable may include an identifier of the compute node writing the SSTable combined with (e.g., concatenated to) a monotonically increasing local value that increments (e.g., by a fixed value such as 1, by a variable value, etc.) as new SSTables are added to the LSM tree by the same compute node. For example, if the identifier of a compute node in the plurality of compute nodes is "ComputeNode1", the first SSTable written by this compute node may be named as "ComputeNode1-1", while the second SSTable may be named as "ComputeNode1-2" and so on. In certain embodiments, the unique name of each SSTable of the first level of the LSM tree may be preceded by an identifier of the first level (e.g., "L0"). Starting the names with "L0" may enable a merging entity to iterate through the LSM tree and find all the L0 nodes to be merge together and move them to the lower levels. For example, the first three SSTables of compute node "ComputeNode2" may be named, respectively, as "L0-ComputeNode2-1", "L0-ComputeNode2-2", and "L0-ComputeNode2-3".

As described above, when an LSM tree is out of shape, a merging entity may move the SSTables stored in each level of the tree that is oversized (e.g., the level's size has reached or passed a threshold) to one level below by merging the SSTables of the two levels in order. In some embodiments, for the first level (L0) of the LSM tree though, the merging entity may merge the SSTables of each compute node (e.g., having the same compute node ID in their name) together and in order before merging the result to the SSTables of L1. Merging the SSTables of different compute nodes, however, does not have to be in any particular order since different compute nodes work on different sets of keys. For example, the merging entity may identify, in the first layer of the tree, SSTables that share a common compute node ID in their name. The merging entity may then combine the key-value pairs of the identified tables by sequentially examining the tables from the table that has the smallest local value in its name to the table that has the greatest local value in its name and at each step of such examination merging the values of the redundant keys in each pair of tables. More detail on how the redundant keys of multiple tables may be merged together is described below with reference to FIG. 6.

Additionally, a compaction process is a very storage-heavy and time consuming process. This is because compaction typically involves reading several levels of the LSM tree, merging the SSTables of the different levels, and then writing new and sorted SSTables back into the LSM tree. Failing to complete the compaction process in a timely manner may result in the LSM tree staying in an inefficient representation with a poor lookup and range scan performance. At the same time, compaction of an LSM tree may also use so much of a system's compute resources that write operations to the LSM tree may often be stalled or slowed down during the compaction process. As a result, certain embodiments described herein may shard the compaction process of an LSM tree by partitioning the tree into several different shards and having multiple merging entities compact a set of one or more of the shards in parallel.

In some embodiments, the largest level of an LSM tree (e.g., the last level of the tree) may be sampled to determine different ranges of keys, or boundaries, for the different shards. The reason for selecting the last level of the LSM tree for sampling is that key distribution in the last level may be more stable than the other levels. In some other embodiments, other criteria may be determined for key sampling. As an example, if the LSM tree is partitioned to 10 different shards, the last level of the tree may be divided into 10

(substantially) equal portions (e.g., each portion containing ~10% of the storage of the last level) and the range of the keys within each portion may define the boundaries for that portion. For example, keys with values between 0-999 may be assigned to the first portion, while keys with values between 1000-2e7 may be assigned to the second portion, and so forth. In some embodiments, the shards boundaries may be readjusted based on the occurrence of an event. As an example, a balancing process may periodically check the sizes of the shards of the LSM tree and if the size of at least one of the shards has reached or past a threshold, the process may readjust the boundaries of the shards with new key values.

FIG. 1 is a block diagram illustrating a computer system 100 in which one or more embodiments of the present application may be utilized. Computer system 100 may include a datacenter 102, a secondary datacenter 104, a network 140, several compute nodes 155, an object storage 165, and a metadata storage 134. Network 140 may be, for example, a direct link, a local area network (LAN), a wide area network (WAN), such as the Internet, another type of network, or a combination of one or more of these networks.

Datacenter 102 may include host(s) 105, a virtualization manager 130, a gateway 124, a management network 126, a data network 122, and an object store 116. Networks 122 and 126 may provide Layer 2 or Layer 3 connectivity in accordance with the Open Systems Interconnection (OSI) model, with internal physical or software defined switches and routers not being shown. Although management and data network 126 and 122 are shown as separate physical networks, it is also possible, in some implementations, to logically isolate the management network from the data network, e.g., by using different VLAN identifiers.

Each of hosts 105 may be constructed on a server grade hardware platform 106, such as an x86 architecture platform. For example, hosts 105 may be geographically co-located servers on the same rack. Hardware platform 106 of each host 105 may include components of a computing device such as one or more central processing units (CPUs) 108, system memory 110, a network interface 112, storage system 114, a host bus adapter (HBA) 115, and other I/O devices such as, for example, USB interfaces (not shown). Network interface 112 may enable host 105 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks, as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 may represent persistent storage devices (e.g., one or more hard disks, flash memory modules, solid state disks, non-volatile memory express (NVMe) drive, persistent memory devices, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Local storages 114 housed in, or directly attached to, host machines 105, may provide an aggregate object store 116 for virtual machines (VMs) 120 running on hosts 105. As shown and described, object storage 116 may include combinations of solid state drives (SSDs) or non-volatile memory express (NVMe) drives 117, magnetic or spinning disks or slower/cheaper SSDs 118, or other types of storages. The objects stored in object store 116 may include file system objects and other VM related objects, such as virtual disks (VMDKs) of the VMs, etc.

System memory 110 may be hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 may also include a cache that includes cached copies of storage blocks of objects in storage 114 or object store 116. The cached storage blocks in cache may be fetched into memory 110 during different memory operations, such as memory read/write, deduplication, etc.

Host 105 may be configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine.

It should be noted that although the disclosure is described with reference to VMs, the embodiments described herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 may communicate with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual computing instance (e.g., a VM) in one of hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as comprising a hypervisor 116 and virtual machines 120, in an embodiment, hosts 105 may comprise a standard operating system instead of a hypervisor 116, and hosts 105 may not comprise VMs 120. In this embodiment, data center 102 may not comprise virtualization manager 130.

Gateway 124 may provide hosts 105, VMs 120, and other components in data center 102 with connectivity to one or more networks used to communicate with one or more remote datacenters and/or other devices/servers, such object storage 165, compute nodes 155, secondary datacenter 104, etc., for example, through network 140. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Host 105 may also include an uploader manager 135 which may manage uploading data to object storage 165 and compute nodes 155 for backup in some embodiments. Although shown as a VM, uploader manager 135 may be any other type of VCI, such as a container, a data compute node, an isolated user space instance, etc., in some embodiments. Additionally, uploader manager 135 may be an agent (e.g., a module) running in hypervisor 116 (or other operating system) of host 105 in some embodiments. In some embodiments, uploader manager 135 may be part (e.g., a submodule) of a storage management module (also referred to as a vSAN module) that automates storage management workflows (e.g., creates objects in object store 116, etc.) and provides access to objects in object store 116 (e.g., handle I/O operations on objects in the object store, etc.) based on predefined storage policies specified for objects in the object store. For example, because a VM may be initially configured by an administrator to have specific storage requirements for its "virtual disk" depending on its intended use (e.g., capacity, availability, input/output operations per second (IOPS), etc.), the administrator may define a storage profile or policy for each VM specifying such availability, capacity, TOPS and the like. As such, the vSAN module may then create an "object" for the specified virtual disk by backing it with physical storage resources of object store 116 based on the defined policy.

Uploader manager 135 may receive object data stored in object store 116 and send the data to object storage 165 (e.g., in the cloud) to be stored as backup data for the object. The data may include different snapshots (e.g., backups, delta backups containing only changed data since a previous backup, etc.) of the object taken at different points of time. In some embodiments, uploader manager 135 may send the first snapshot of the object to the data storage 165 and subsequently send only the snapshot differences (may also be referred to as "snapshot diffs", or "Jiffs") to the data storage to be backed up. Additionally, in some embodiments, uploader manager may send information associated with the object, such as object ID, snapshot ID, logical block addresses (LBAs) in which the object is stored, etc., to a set of one or more compute nodes 155. In some embodiments, in addition to objects and their snapshots, uploader manager 135 may store files (and their snapshots) in object storage 165 or another remote storage for backup purposes and send information associated with the stored files to compute nodes 155 to create, manage, and store metadata associated with the files.

The objects may be stored in a log-structured file system (LFS) format in object storage 165 in a set of one or more segments as multiple chunks of data. In some embodiments, each object may be stored in fixed block sizes of data (e.g., each block being 4 kilobyte (KB)) in one or more segments that have fixed segment sizes (e.g., 4 megabyte (MB) for each segment) in object storage 165. Each fixed block size may also be called a chunk of data or simply a chunk in some embodiments. It should be noted that when files are stored in object storage 165 (or any other storage), the chunks may have different sizes (e.g., that are defined on a byte-boundary basis using, for example, robin hash fingerprints).

In some embodiments, the set of compute nodes may receive information associated with the objects stored in object storage 165 (e.g., as a plurality of chunks), generate metadata associated with each object based on the received information, and store the generated metadata in an LSM tree data structure in metadata storage 134. Metadata storage 155 and object storage 165, in some embodiments, may be stored in public cloud (e.g., Amazon S3) even though they are separate storages. Additionally, the metadata storage and object storage may be part of storage resources of a cloud computing system that in combination with datacenter 102 may render a hybrid cloud. For example, the hybrid cloud may include a public cloud (not shown in the figure) and an on-premise datacenter, such as datacenter 102.

It should be noted that in some embodiments, the object data and its associated metadata may not necessarily be only backup data. For example, instead of, or in conjunction with, the backup data, the object data and its associated metadata may include original data related to the objects that are stored in the public cloud, for example, due to lack of enough space in datacenter 102. For example, because storage resources provided by on-premise datacenter 102 may be limited, data produced or stored within on-premise datacenter 102 may, in certain cases, be transmitted to a cloud computing system for storage in storages 134 and 165 among other storage resources of the public cloud. In such cases, a file system(s) (e.g., a distributed file system) operating within on-premise datacenter 102 may be configured to utilize storage resources of the public cloud as secondary storage resources. In one example, the file system may be configured to cache hot data in object store 116 and overflow cold data into storage resources of the public cloud including storage 165. In other words, in such an example, object storage 116 may be used by the file system as a read cache and write-back staging area, while the storage resources of the public cloud may be treated as disk storage. Hot data may refer to data that is frequently accessed, while cold data may refer to data that is accessed less often.

As shown in FIG. 1, compute nodes 155 may interact with metadata storage 134 to create, update, and manage metadata tables, such as tables 142, 144, and 146. In some embodiments, all or some of the metadata tables stored in metadata storage 134 may be key-value (KV) tables. A KV table may include a table ordered by keys that when given a key, may return a value that is mapped to that key. KV tables 142, 144, and 146 are described in more detail below with reference to FIG. 2. It should be noted that even though only 3 metadata tables are shown in FIG. 1, metadata storage 134 may include many more tables and/or other forms of data structures that contain other metadata. For example, metadata storage 134 may include an additional KV hash table (not shown in the figure) that maps the calculated hashes of chunks (e.g., associated with an object) to the chunk IDs of the object in some embodiments.

In case of a failure in datacenter 102 (e.g., when part or all of the data stored in object store 116 is damaged or lost, when datacenter 102 is under a cyber-attack, etc.), a secondary or recovery datacenter, such as secondary datacenter 104, may use the metadata stored in the metadata storage 134 to retrieve the backed up data (e.g., objects and/or files) stored in object storage 165. After retrieving the backup data (e.g., snapshots of the VMDKs), secondary datacenter 104 may use the data to recreate the objects (e.g., the virtual disks) and run the VMs of datacenter 102. The organization of metadata in metadata storage 134 and object data in object storage 165 may allow secondary datacenter 104 to be up and running in a short period of time after a failures (e.g., occurrence of a disastrous event) in the primary datacenter 102.

Figure 2A:
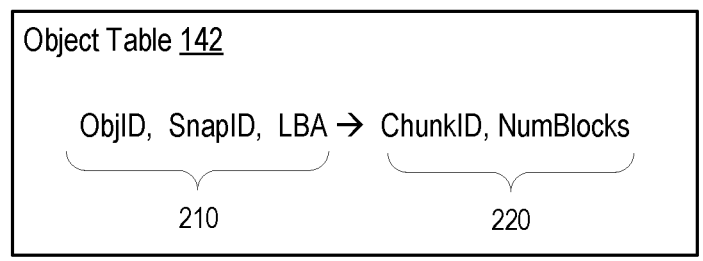
FIGS. 2A-2C illustrate a few example key-value metadata tables in a metadata storage, according to an example embodiment of the present application.
Figure 2B:
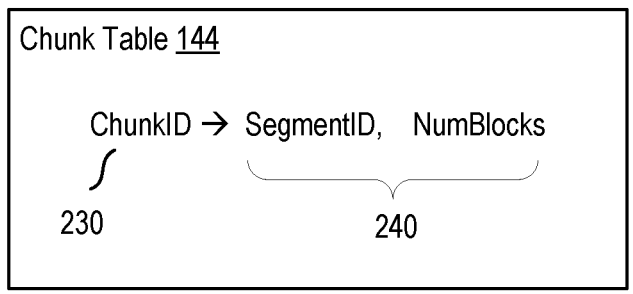
Figure 2C:
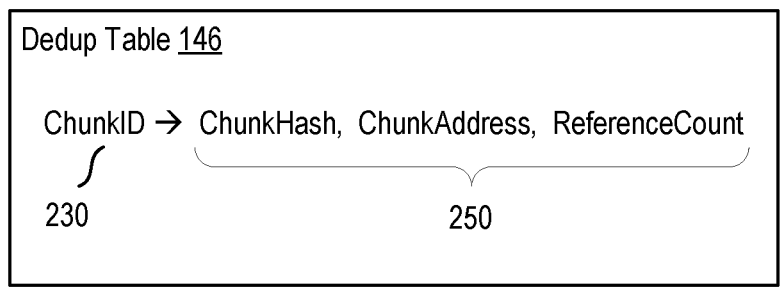

FIGS. 2A-2C illustrate a few example key-value metadata tables in a metadata storage, according to an example embodiment of the present application. Specifically, FIG. 2A illustrates an exemplary object table 142 that maps some of the received information associated with an object to chunk IDs and number of (logical) blocks associated with the object, according to an example embodiment of the present application. For example, when a compute node receives, for an object, an object ID "ObjID," a snapshot ID "SnapID," and a number of logical blocks "NumBlocks," the compute node may first generate a new chunk ID and then add a new record to table 142 that maps a three-tuple key <objectID, snapID, LBA> 210 to a two-tuple value <chunkID, NumBlocks> 220.

FIG. 2B illustrates an exemplary chunk table 144 that maps the chunk IDs associated with an object to the segment IDs and number of (physical) blocks associated with the segment, according to an example embodiment of the present application. For example, after generating the chunk ID for the received object in table 142, the compute node may add a new record to table 144 that maps a one-tuple key <ChunkID> 230 to a two-tuple value <SegmentID, NumBlocks (e.g., physical blocks)> 240. Similarly, FIG. 2C illustrates an example deduplication table 146 that maps the chunk IDs 230 associated with an object to a set of information 250, according to an example embodiment of the present application.

Specifically, FIG. 2C shows key-value mappings between a one-tuple key <ChunkID> 230 and a three-tuple set of information 250 corresponding to the chunk ID 230 that may include a chunk hash, a pointer (e.g., a logical or physical address) that points to the content of a corresponding chunk, and a reference count of the corresponding chunk. Reference count of a chunk may include the number of pointers that point to the content of the chunk. More detail about how a deduplication module may use table 146 to perform a deduplication process that uses contiguous chunk IDs may be found in commonly owned U.S. patent application Ser. No. 16/552,998, entitled "Organize Chunk Store to Preserve Locality of Hash Values and Reference Counts for Deduplication," filed on Aug. 27, 2019, the entire content of which is incorporated herein by reference.

As described above, because a data store (e.g., provided by a public cloud computing system) may not allow for data overwrites, it is advantageous to store data in such a storage system using an LSM tree data structure. An LSM tree is a write-optimized data structure that performs sequential writes in batches. Also, an LSM tree may include multiple levels within which, the stored data (e.g., data tuples of metadata tables 142, 144, and 146, described above with reference to FIG. 2) may be grouped into separate SSTables. More specifically, a file system may batch writes together in memory and write them to storage as an SSTable, which is a sequential log. Each SSTable comprises one or more tuples of the LSM tree. Each tuple of the LSM tree comprises a key (e.g., a 4 KB data block offset, a (logical) block address, or any other identifier of the data), and a corresponding value (e.g., content of a 4 KB block, an operation, such as delete (e.g., the data in the corresponding block address), insert, add, etc.).

Figure 3:
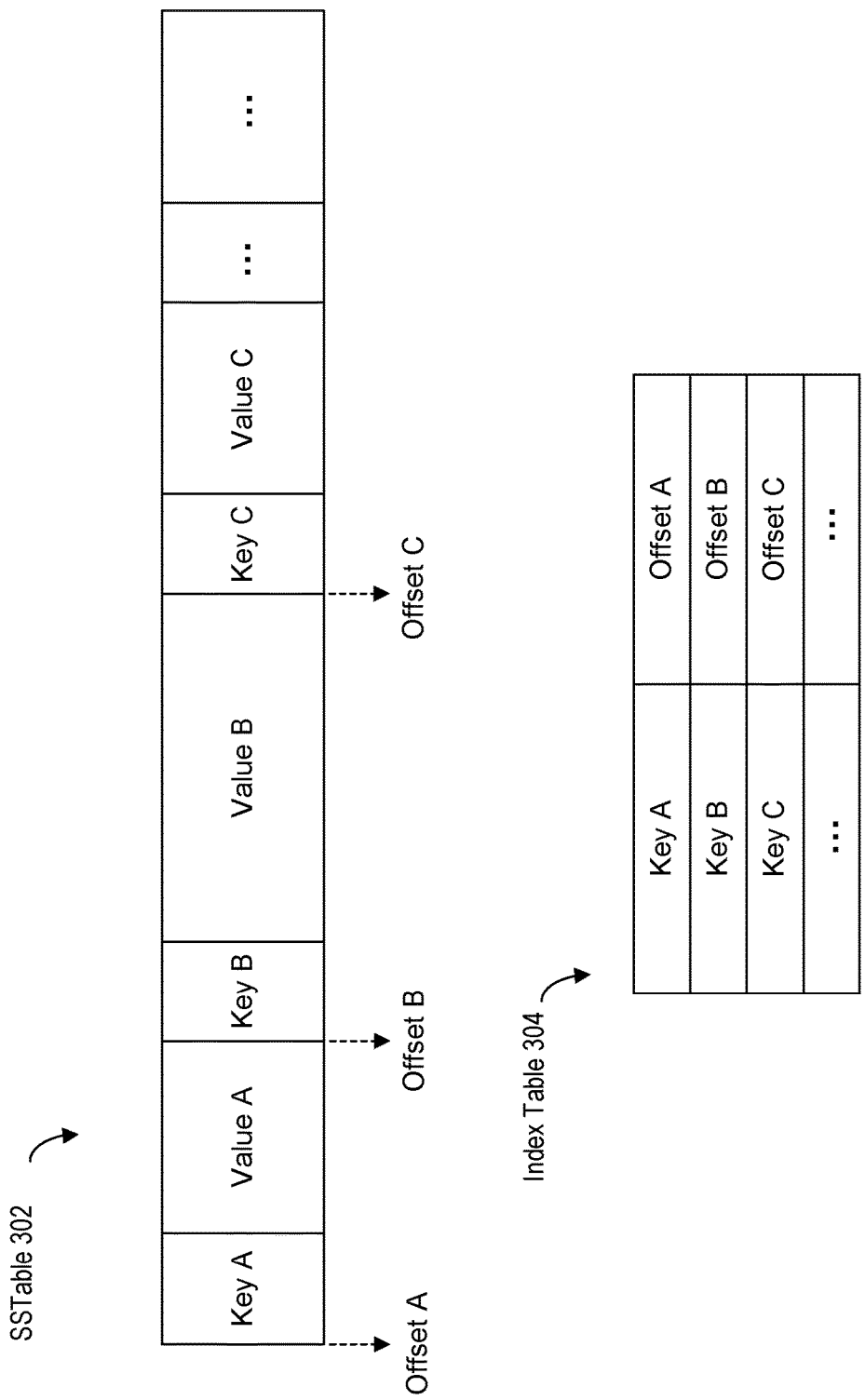
FIG. 3 illustrates an example of an SSTable of one of the levels (e.g., L0) of an LSM tree, according to an example embodiment of the present application.

FIG. 3 illustrates an example of an SSTable of one of the levels (e.g., L1) of an LSM tree, according to an example embodiment of the present application. As shown, SSTable 302 may include a group of sorted data tuples. For example, the illustrated SSTable 302 includes Key A and Value A, corresponding to a first tuple, Key B and value B, corresponding to a second tuple, and Key C and Value C corresponding to a third tuple. The sorted order of the keys within an SSTable makes finding a certain value within the SSTable more efficient. For example, an I/O operation performed to read Value C in SSTable 302 is able to use the binary search which takes O(log N) time to finish.

In certain embodiments, in order to make I/O operations even more efficient, an index table, such as index table 304, may be created for each SSTable and held in memory. As shown, index table 304 may map the keys associated with SSTable 302 to their corresponding offsets in SSTable 302. As such, a certain I/O operation in search of, for example, Key B would first consult index table 304 and find Offset B. Using Offset B, the corresponding Key B and, therefore, Value B may be more efficiently found in SSTable 302. Because an index table is much smaller in size than its corresponding SSTable, it can be cached locally. In certain aspects, if the whole index table 304 is not cached in memory, binary search may be used to find a specific key in index table 304 using an order of log N operations, which may be more efficient than sequentially scanning index table 304 and may not have a high memory requirement of storing the whole index table 304 in memory. In such aspects, parts of index table 304 that are accessed frequently may be cached in a region of memory that is much smaller than the overall size of index table 304.

In some embodiments, a certain limit is defined for each SSTable, which the file system may store as a file. For example, a user-defined and tunable size limit may limit the size of data in each SSTable. In another example, each SSTable may only be allowed to include a certain number of tuples. When data within an SSTable reaches the limit, the file system may create a new SSTable for storing additional data. Also, in certain aspects, each SSTable may be an immutable representation of tuples such that, for example, an update to data associated with a tuple that is already stored in an existing SSTable may not overwrite the tuple in the existing SSTable. Instead, the file system may write the update to a new SSTable with a key that is the same key as the tuple's key. For example, when data associate with a key is later deleted, a new tuple may be written to the SSTable that includes the same key and an indicator that may indicate the previous data is now deleted.

As discussed, a set of one or more compute nodes, such as compute nodes 155 described above with reference to FIG. 1, may preform I/O operations on an LSM tree data structure in parallel in some embodiments. To perform the I/O operations independent of each other, each compute node may be assigned a different range of keys to write in the LSM tree. Additionally, each compute node may assign a unique name to the SSTables it stores in the LSM tree to separate the SSTables that are written by the compute node from other SSTables (e.g., written by other compute nodes).

Figure 4:
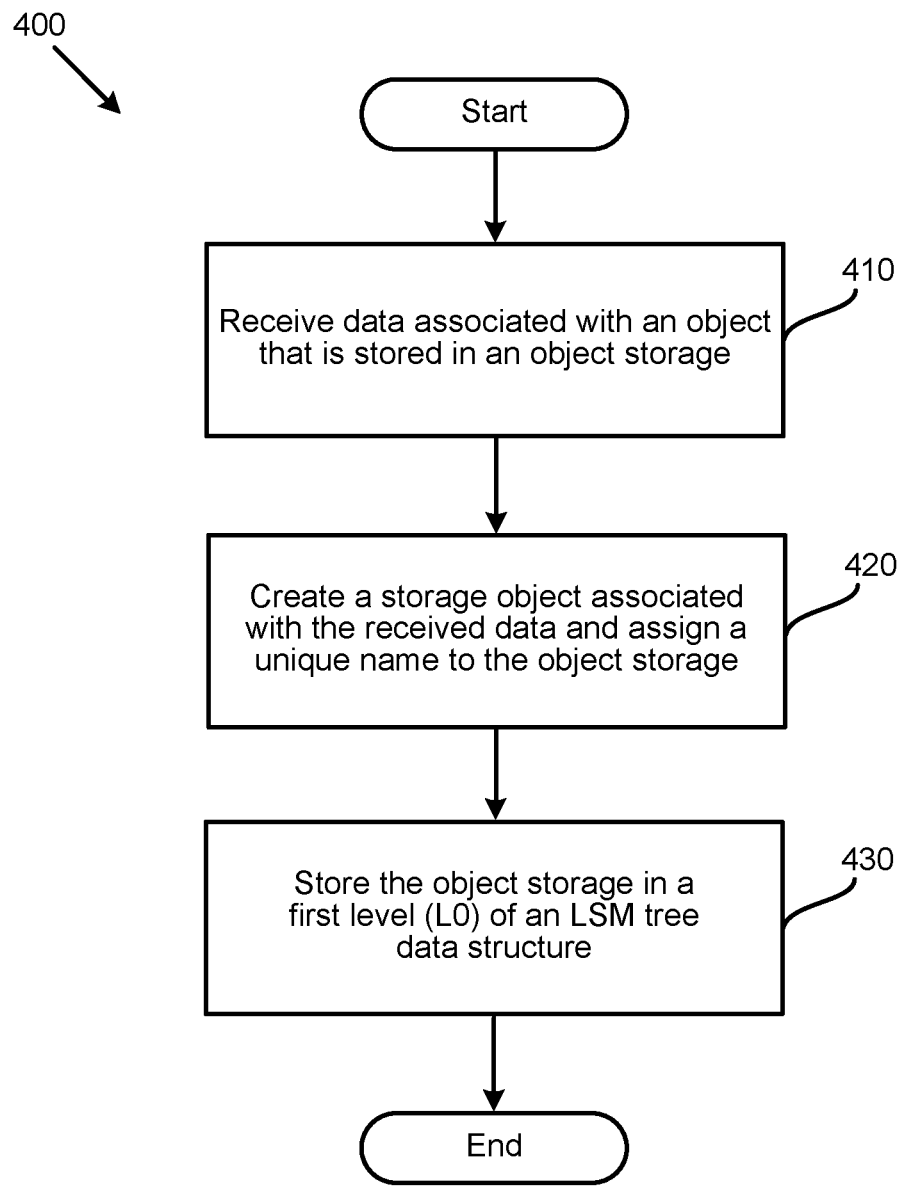
FIG. 4 is a flowchart illustrating a method (or process) for storing metadata related to stored objects in a metadata storage in an LSM tree data structure, according to an example embodiment of the present application.

FIG. 4 is a flowchart illustrating a method (or process) 400 for storing metadata related to stored objects in a metadata storage, such as metadata storage 134, in an LSM tree data structure (e.g., stored in the cloud), according to an example embodiment of the present application. Process 400 may be performed by any of one or more compute nodes, such as compute nodes 155, as described above with reference to FIG. 1 in some embodiments. A compute node may include a physical computing device, such as an individual server or a host machine (e.g., that hosts several VCIs). The compute node may also be a VCI, such as a VM or a container, etc. The host machine may be any of hosts 105 shown in datacenter 102 (in FIG. 1) or a host machine of a public cloud (e.g., when utilizing a hybrid cloud architecture). Similarly, the VCI may be a VCI running in any of hosts 105, or any host in the public cloud.

Process 400 may start by receiving, at 410, first data associated with an object that is stored in an object storage (e.g., object storage 165). In some embodiments, the process may receive data related to an object at the same time that the object is stored in an object storage, such as object storage 165. In some embodiments, an agent, such as uploader manager 135 described above with reference to FIG. 1 may send the object data, for example, to one or more storage servers to store the object in the object storage. As discussed above, the object may be stored as blocks (or chunks) of data in one or more segments of the object storage. Each block may have a size of 4 KB (or smaller due to compression) and each segment may have a size of 4 MB in some embodiments. The sizes of the blocks and segments, however, may be different in different embodiments.

The uploader manager may also send information associated with the object to a plurality of compute nodes to generate and store metadata for the object, for example, in a separate metadata storage. For example, after sending the object data to the object storage, the uploader manager may select one of the compute nodes as the compute node that is responsible for generating the metadata for the object. The uploader manager may select the compute node based on the range of keys that is assigned to the compute node. For example, if the uploader manager determines that a key-value pair that is to be written in the metadata storage has a key "X" and "X" is within a range of keys that are assigned to the second compute node, the uploader manager may send the key-value pair to the second compute node to write to the metadata storage (e.g., to the LSM tree of the metadata storage).

After receiving the data, process 400 may create, at 420, a storage object associated with the received data and assign a unique name to the object storage. The storage object may be an SSTable that includes the key-value pairs received from the uploader manager. The unique name assigned to an SSTable may include one or more of an identifier of the first level of the LSM tree (e.g., "L0), an identifier of the compute node that writes the SSTable, and an incremental local value, which may increment for each new SSTable. For example, if the identifier of a compute node in the plurality of compute nodes is "ComputeNode1", the first SSTable written by this compute node may be named as "L0-ComputeNode1-1". It should be noted that even though each element in the combined name is separated by a dash ("-"), the elements may be separated by any other separator character, such as a comma (","). This way, as described in more detail below, a compactor or merging entity may easily determine which SSTables are written by the same compute node and consequently merge such SSTables together during a compaction process of the LSM tree. At 430, process 400 may store the object storage (e.g., the SSTable) in the first level (L0) of the LSM tree data structure. The process may then end.

Figure 5:
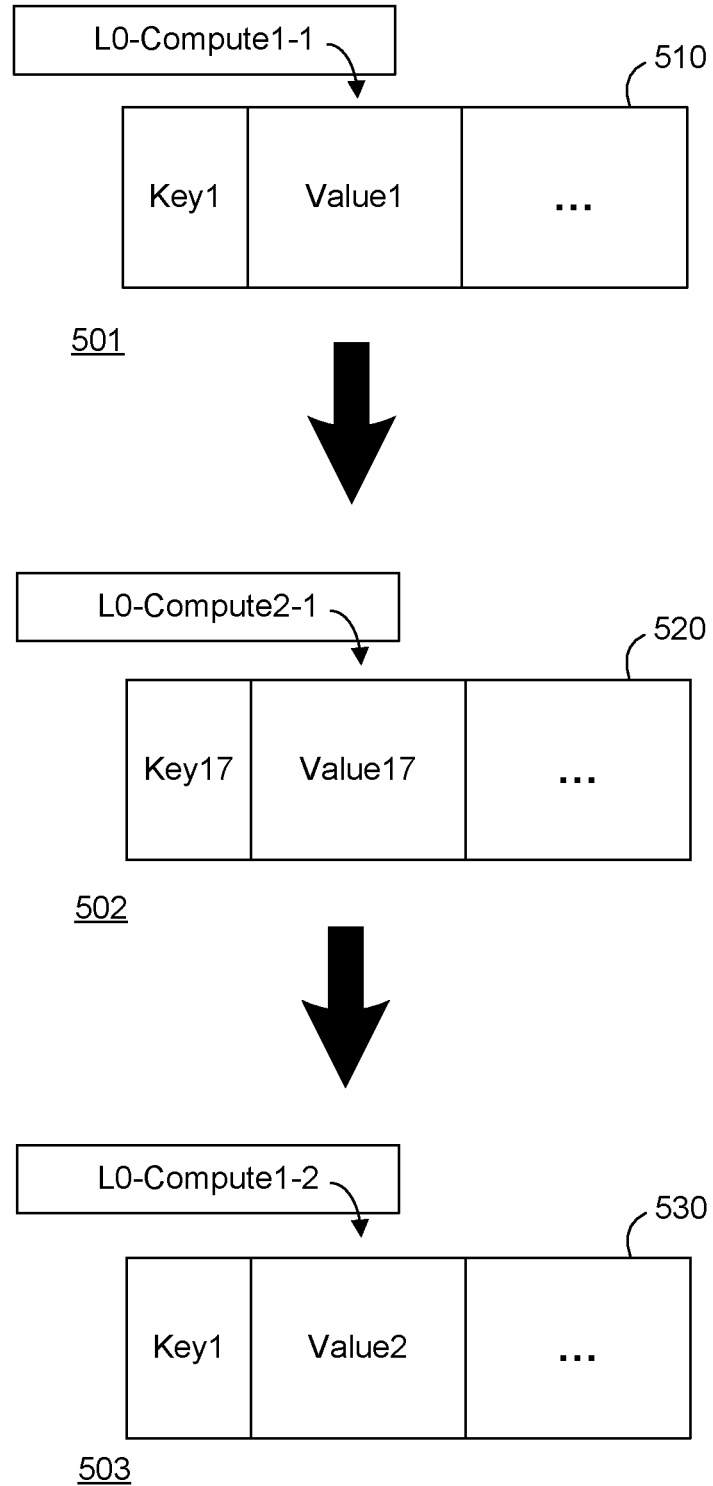
FIG. 5 illustrates, in three block diagrams, how a compute node creates and names three SSTables for data associated with one or more objects and stores the SSTables sequentially in an LSM tree, according to an example embodiment of the present application

FIG. 5 illustrates, in three block diagrams 501-503, how a compute node creates and names three SSTables for data associated with one or more objects and stores the SSTables sequentially in an LSM tree, according to an example embodiment of the present application. As shown in block diagram 501, data received and stored in SSTable 510 may include multiple key-value pairs starting with Key1-Value1. After the compute node determines that the SSTable is the first table the compute node is writing to the LSM tree, it may assign the name "L0-Compute1-1" to the SSTable, which indicates the table is written to L0 of the LSM tree by a compute node identified as "Compute1". The name also indicates that this is the first SSTable written by Compute1, since the sequential local value (e.g., third element) in the name is 1.

Block diagram 502 shows that the next set of data received and stored in SSTable 520 also includes multiple key-value pairs which start with Key17-Value17. As shown in the figure, for this new set of key-value pairs, however, a different compute node creates and stores SSTable 520 in the LSM tree. This is because, for example, keys 1-10 are assigned to the first compute node, while keys 11-20 are assigned to a second compute node. After the second compute node determines that SSTable 520 is the first table this compute node is writing to the LSM tree, it may assign the name "L0-Compute2-1" to the SSTable, which indicates the table is written to L0 of the LSM tree by a compute node identified as "Compute2". The name also indicates that this is the first SSTable written by Compute2, since the sequential local value (e.g., third element) in the name is 1.

Block diagram 503 illustrates that the next set of data received and stored in SSTable 530 includes several key-value pairs which start with Key1-Value2. As shown in the figure, for this new set of key-value pairs, the first compute node creates and stores SSTable 530 in the LSM tree. After the first compute node determines that SSTable 530 is the second table this compute node is writing to the LSM tree, it may assign the name "L0-Compute1-2" to the SSTable, which indicates that the table is written to L0 of the LSM tree by a compute node identified as "Compute1". The name also indicates that this is the second SSTable written by Compute1, since the sequential local value (e.g., third element) in the name is 2.

The different compute nodes may similarly receive data (e.g., from different uploader managers running in datacenter 102) and store the data as key-value pairs in different SSTables in L0 of the LSM tree sequentially. After a while, the first level of the tree may reaches a threshold defined for this level, as different thresholds may be defined for different levels of the LSM tree. For example, L0 may be configured to only include an X number of SSTables or an X amount of data. L1's limit, on the other hand, may exponentially increase to 4X while L2's limit may be 16X in some embodiments. Reaching, or surpassing the defined threshold by any level of the LSM tree may cause the tree to become out of shape.

In some embodiments, a file system may determine whether an LSM tree is out of shape by examining a catalogue file associated with the LSM tree. A catalogue file is generally created to enable a file system to efficiently find SSTables within a corresponding LSM tree. The catalogue file may serve as a superblock of the on-disk representation of a corresponding LSM tree and includes metadata associated with each SSTable, including the SSTable's name and key range. In one example, a superblock may be a record of the characteristics of a file system, including its size, the block size, the empty and the filled blocks and their respective counts, the size and location of the inode tables, the disk block map and usage information, and the size of the block groups. The catalogue file is cached locally and uploaded to object storage 165 per update.

As described above, when an LSM tree is out of shape, a compactor or merging entity may (e.g., periodically) move the SSTables stored in each level of the tree that is oversized (e.g., the level's size has reached or passed a threshold) to one level below by merging the SSTables of the two levels in order. In some embodiments, since the first level (L0) of the LSM tree is not in order (e.g., because all the tables are written to this level sequentially), the merging entity may merge the SSTables of each compute node (e.g., having the same compute node ID in their name) in L0 together and in order first and then before merge the result to the SSTables of one level below (e.g., L1) in the LSM tree.

Figure 6:
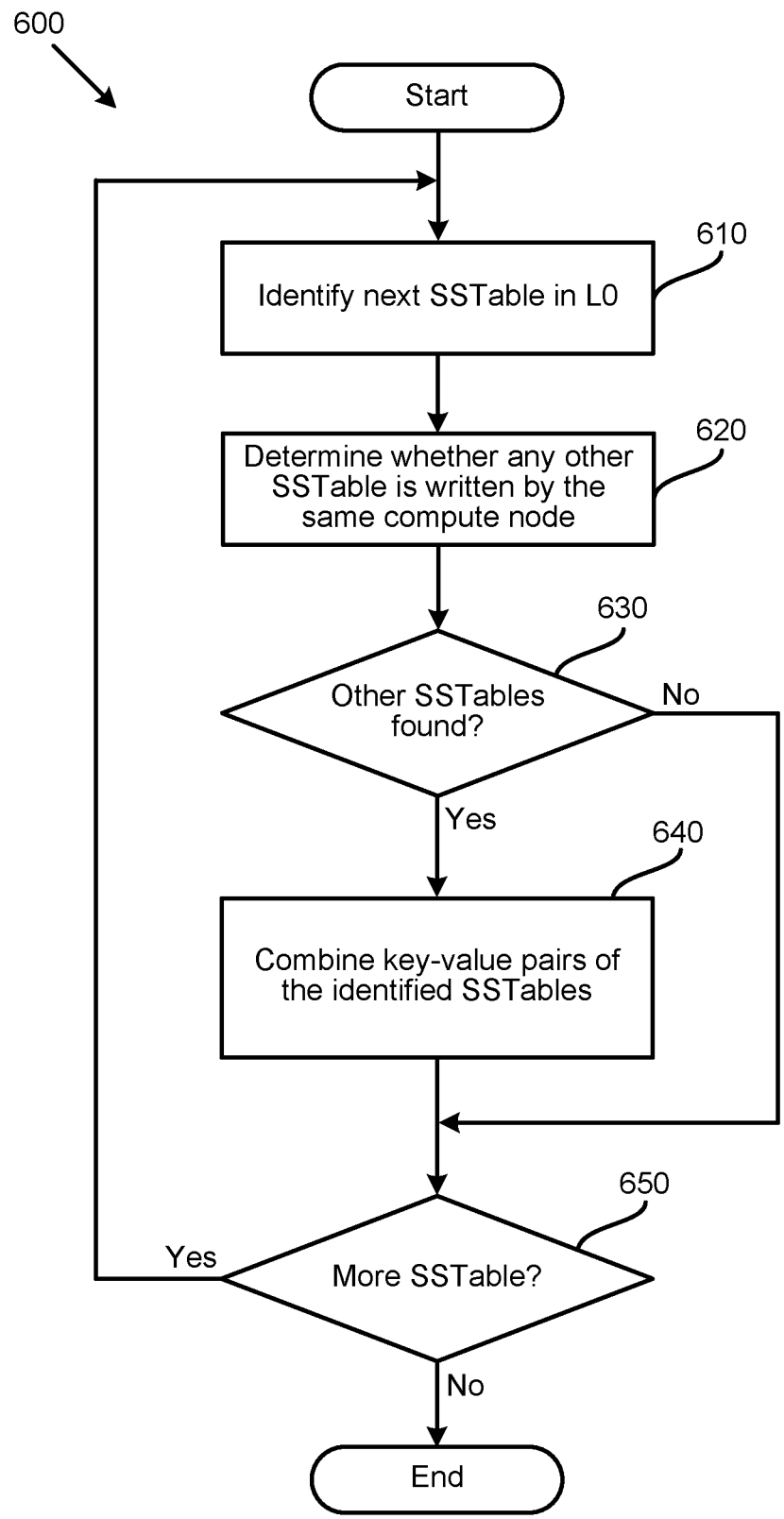
FIG. 6 is a flowchart illustrating a method (or process) for merging the unsorted SSTables of the first level (L0) of an LSM tree using the unique names of the SSTables, according to an example embodiments of the present application.

FIG. 6 is a flowchart illustrating a method (or process) 600 for merging the unsorted SSTables of the first level (L0) of an LSM tree using the unique names of the SSTables, according to an example embodiments of the present application. Process 600 may be performed by a merging entity. The merging entity may include a physical computing device (e.g., a host machine) or a VCI (e.g., a VM). The physical or virtual computing device may be part of a datacenter, such as datacenter 102 (shown in FIG. 1) or part of a public cloud (e.g., when utilizing a hybrid cloud architecture).

Process 600 may start by identifying, at 610, the next SSTable in L0 of the LSM tree. If the process is performed for the first time, the process may identity the first SSTable stored in L0 at 610. Next, process 600 may determine, at 620, whether any other SSTable of L0 is written by the same compute node with which the identified SSTable is written. To do so, the process may attempt to find all the SSTables that share the same compute node ID in their name that is also included in the name of the identified SSTable. At 630, process 600 may determine whether any other SSTable that that is written by the same compute node is found. If the process determines, that no SSTable has been written by the same compute node as the first SSTable (e.g., no SSTable is found at 630), the process may proceed to 650, which is described below.

On the other hand, if the process determines, at 630, that at least one other SSTable is found, process 600 may combine or merge, at 640, the key-value pairs of the identified SSTable with the key-value pairs of the other found SSTable(s). For example, to merge the key-value pairs of the identified SSTables that are duplicates, the process, in some embodiments, may create a new key-value pair that includes the same redundant key of the duplicate key-value pairs. However, the value of the new key-value pair may include a data of values (and operations) included in each duplicate key-value pair by examining the SSTables from the table that has the least local value to the table that has the greatest local value in its name. For example, if a first table includes a key-value pair having a key of "A" and a value of "10", and a second table (e.g., with second smallest local value) includes a key-value pair that has the same key of "A" and a value of "add 3", then the process may create a new key-value pair that includes "A" as the key, and "13" as the value of the newly created key-value pair (e.g., by adding 3 to 10). Conversely, if a third table (e.g., with third smallest local value) includes a key-value pair having "A" as the key and "delete" as the value, the process may replace the value "13" with "delete" in the created key value-pair. This new key-value pair may then replace all the duplicates key-value pairs in the merged table.

After combining the key-value pairs of all the SSTables that are written by the same compute node, process 600 may determine, at 650, whether any other SSTable is left in L0 of the LSM tree that is not examined. If process 600 determines that there are additional SSTables in L0, the process may return to 610 to identify the next SSTable of L0 and to repeat operations 620-650 for the next identified SSTable. If the process determines that no more SSTable is left in L0 to examine, the process may end.

The specific operations of process 600 may not be performed in the exact order shown and described. Additionally, the specific operations may not be performed in one continuous series of operations, and different specific operations may be performed in different embodiments. For example, in some embodiments, process 600 may, after determining, at 650, that no more SSTable is left in L0 to merge, combine the result of merging the SSTables in L0 with sorted SSTables of the second level (L1) of the tree to open up space in L0 for adding new data to the LSM tree (e.g., by the compute nodes). In some other embodiments, process 600 may, after SSTables of each compute node are merged together at 640, combine the result of merging the SSTables of that compute node with sorted SSTables of L1.

Figure 7:
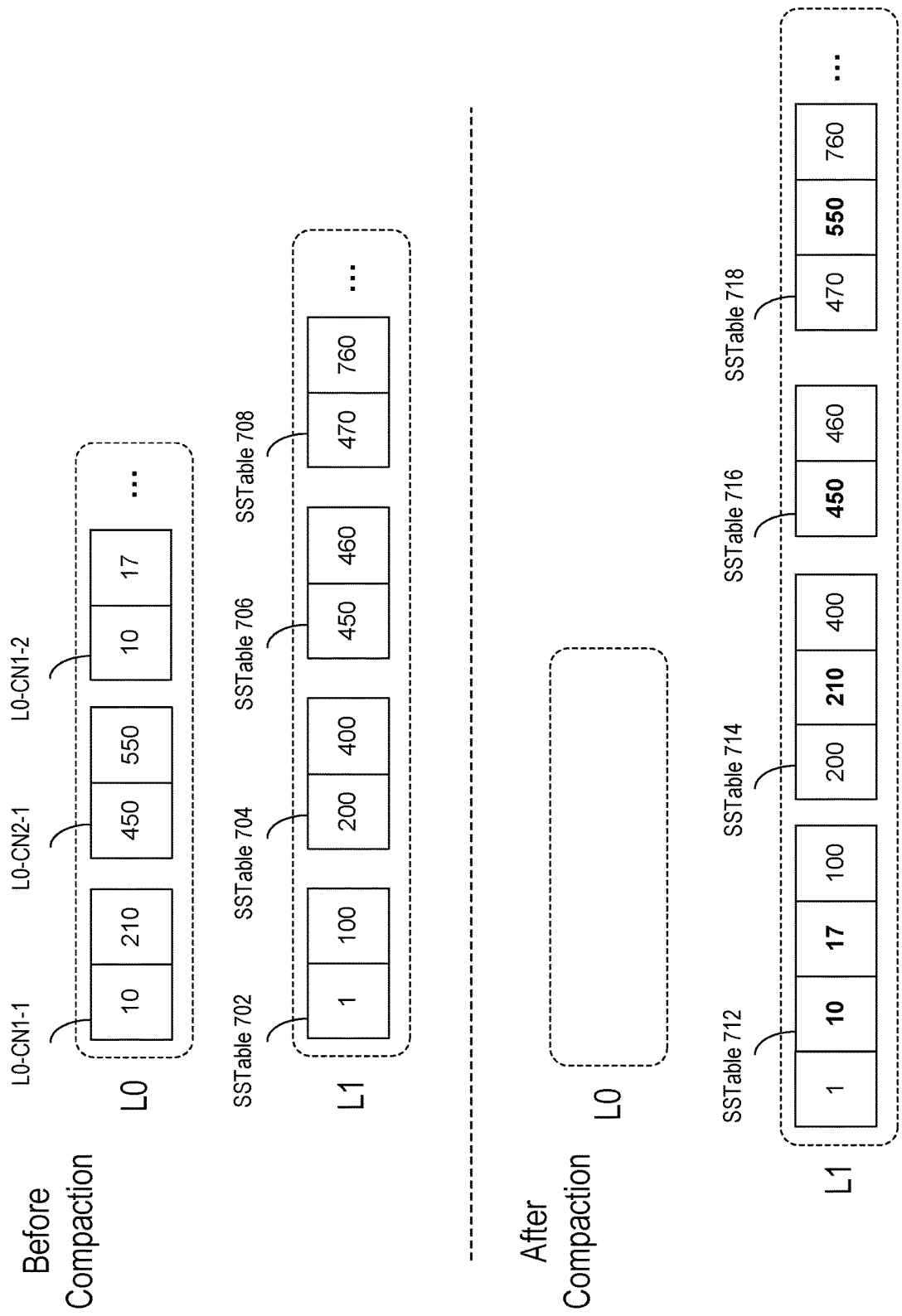
FIG. 7 illustrates an example compaction of levels L0 and L1 of an LSM tree data structure, according to an example embodiment of the present application.

FIG. 7 illustrates an example compaction of levels L0 and L1 of an LSM tree data structure, according to an example embodiment of the present application. As shown, before compaction, L0 comprises SSTable L0-CN1-1, having keys 10 and 210, SSTable L0-CN2-1, having keys 450 and 550, and SSTable L0-CN1-2, having keys 10 and 17. For simplicity, only the keys are shown in each SSTable of FIG. 7. In other words, SSTable L0-CN1-1, having keys 10 and 210 in fact includes key 10, the corresponding value of which is not shown in the table. Similarly, the corresponding value of key 210 is not shown in the SSTable either. Also, before compaction, L1 comprises SSTable 702, having keys 1 and 100, SSTable 704, having keys 200 and 400, SSTable 706, having keys 450 and 460, and SSTable 708, having keys 470 and 760. As described above, during compaction, key-value pairs (or tuples) of SSTables within L0 that are written by the same compute node may be merged together and then merged with tuples of SSTables within L1. For example, the merging entity may first determine that SSTable L0-CN1-1 and SSTable L0-CN1-2 are written by the same compute node (e.g., CN1) and further, the second SSTable L0-CN1-2 is the more recent SSTable that is written by CN1 (e.g., because of having a greater local value of 2). As such, the merged SSTable may include keys 10, 17, and 210, such that the value associated with key 10 may be the delta of the two values of key 10 included in the two tables. For example, if the first value is a first block of data and the second value is a second block of data that should replace the first block, the delta may be the same value included in the second SSTable L0-CN1-2. However, as described above, if the first value is, for example, a number, and the second value requires an operation on the first value, the delta may be the result of the operation on the first value.

The merging entity may then combine the merged SSTable of L0 with SSTable 702 and 704 of L1. As shown, as a result of the compaction, new SSTables 712 and 714 are created and stored within L1. When keys from different SSTables are merged, the merging entity of some embodiments may sort the tables based on their keys. For example, in SSTable 712, key 10 of the merged SSTable of L0 may be placed between keys 1 and 100 that were previously stored in SSTable 702. Similarly, key 17 of the merged SSTable may be placed between the newly added key 10 and the previously stored key 100 in the new SSTable 712. Additionally, in the newly created SSTable 714, key 210 of the merged SSTable of L0 may be placed between keys 200 and 400 that were previously stored in SSTable 704.

Similar to merging the SSTables in L0, when merging the SSTables of two different levels, the merging entity may eliminate the redundant or duplicate key-value pairs by examining the tables from the top level to the lower level and merging the key-value pairs that have the same key, but different values, as described above.

After the compaction of L0 and L1 is completed, space may be reclaimed in L0 and also in L1, because all SSTables of L0 are deleted even though new tables 712-718 (e.g., as well as other tables) are added to L1, but SSTables 702-708 (e.g., as well as other tables) of L1 are deleted (e.g., when no older versions of catalogue file point to these SSTables). Also, as described, any redundancies between the two levels may also be now eliminated. It should be noted that for simplicity, the compaction of only two levels of L0 and L1 are shown in FIG. 7. However, an LSM tree, as described above, may include many other levels that might also be involved in the compaction. For example, as data flows from L0 to L1 of the tree data structure, L1 may also exceed its defined size limit, in which case, the extra SSTables of L1 may flow to L2. As a result, subsequent SSTables generated in L1 may be compacted with SSTables in L2 with which they overlap. The merging entity may continue until none of the levels of the LSM tree exceeds its defined size limit. In another example, L0, L1, and L2 may be compacted in one pass and be stored in L3.

It should be noted that the compaction process shown in FIG. 7 is simplified and merely exemplary. Further, it should be noted that one of a variety of methods may be used for merging SSTables from different levels of the LSM tree together. In one example, the merging entity may compare keys in SSTables of the different levels in order to find the lowest key to include in a new SSTable. Once the lowest key from all levels is found, the merging entity may identify the second lowest key from all levels and append it to the lowest key in the new SSTable and so on. Also, when a certain SSTable reaches its size limit, the merging entity may start a new SSTable to continue the merging process.

As described above, a compaction process may be a very time consuming process since it typically involves reading several levels of the LSM tree, merging the SSTables of the different levels, and then writing new and sorted SSTables back into the LSM tree. Failing to complete the compaction process in a timely manner may result in the LSM tree staying in an inefficient representation with a poor lookup and range scan performance. Therefore, certain embodiments described herein may shard the compaction process of an LSM tree by partitioning the tree into several different shards and having multiple merging entities compact a set of one or more of the shards in parallel.

Figure 8:
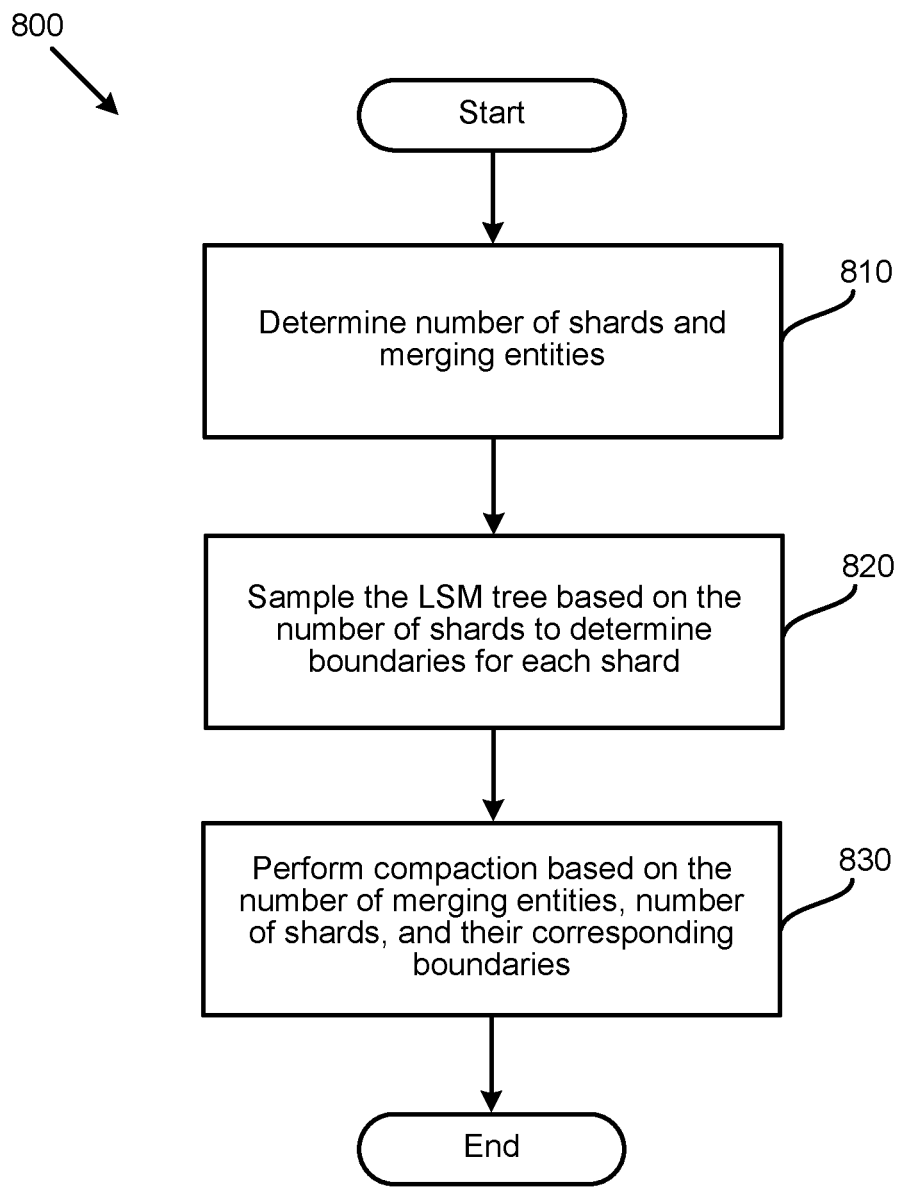
FIG. 8 is a flowchart illustrating a method (or process) for partitioning an LSM tree to multiple shards and having each set of one or more shards compacted by a different merging entity, according to an example embodiment of the present application.

FIG. 8 is a flowchart illustrating a method (or process) 800 for partitioning an LSM tree to multiple shards and having each set of one or more shards compacted by a different merging entity, according to an example embodiment of the present application. Process 800 may be performed by a physical or virtual computing device in charge of performing the compaction. For example, in some embodiments, the computing device may be a host or a VCI running on a host. If the aspects described herein are utilized in connection with a hybrid architecture, the computing device, in some embodiments, may be operating within an on-premise datacenter, such as datacenter 102 and, in certain other embodiments, it may operate within a public cloud computing system.

Process 800 may start by receiving or calculating, at 810, the number of shards into which an LSM tree has to be divided. In some embodiments, the process may calculate the number of shards based on the amount of time (e.g., estimated amount of time) that may take to compact the LSM tree (e.g., data within the LSM tree). In some such embodiments, the amount of time may be calculated based on multiple factors, such as the LSM tree size, the I/O bandwidth, and the recovery point objective (RPO). Once the number of shards is determined, a number of merging entities may be calculated based on the number of shards to perform the compaction in parallel. In some embodiments, each merging entity may be configured to compact one or more shards. More detail about how to determine the number of shards as well as the number of merging entities may be found in commonly owned U.S. patent application Ser. No. 16/212,550, entitled "Systems and Methods for Performing Scalable Log-Structured Merge (LSM) Tree Compaction Using Sharding," filed on Dec. 6, 2018, the entire content of which is incorporated herein by reference.

After determining the number of merging entities and the number of shards assigned to each computing entity, process 800 may sample, at 820, the LSM tree to determine the key ranges or boundaries assigned to each shard. To sample the LSM tree, in some embodiments, the process may sample the largest or last level of the LSM tree since the key distribution in the last level may be more stable than the other levels. For example, if the number of shards for the LSM is determined, at 810, to be 5, process 800 of some embodiments may divide the last level of the LSM tree into 5 (substantially) equal portions (e.g., each portion containing ~20% of the storage of the last level) and the range of the keys within each portion may define the boundaries for a corresponding shard.

After assigning one or more shards to each merging entity and determining the boundaries for each shard, process 800 may have each merging entity perform, at 830, compaction of its associated shards. The process may then end. The specific operations of process 800 may not be performed in the exact order shown and described. Additionally, the specific operations may not be performed in one continuous series of operations, and different specific operations may be performed in different embodiments. For example, in some embodiments, process 800 may first determine a key range for the entire LSM tree and then divide the determined key range into sub-ranges, for example, based on distribution of keys in the last level of the tree, or based on other factors. For example, in some embodiments, each sub-range may have an equal number of keys irrespective of the key distribution in the last level of the LSM tree.

Figure 9:
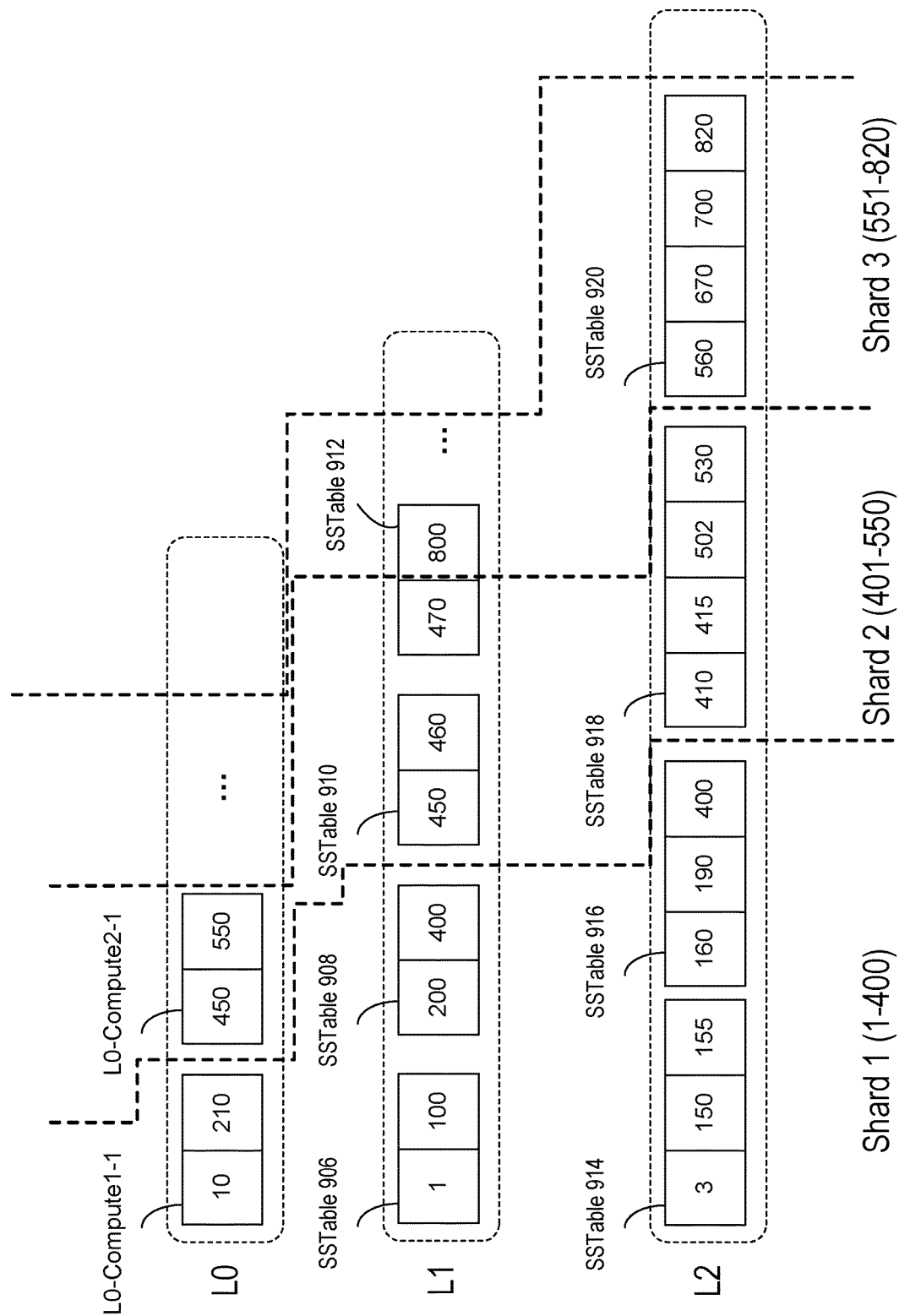
FIG. 9 illustrates a visual example of how the compaction of an LSM tree having three levels may be performed using sharding, according to one example embodiment of the present application.

FIG. 9 illustrates a visual example of how the compaction of an LSM tree having three levels L0-L2 may be performed using sharding, according to one example embodiment of the present application. In the example of FIG. 9, the key range associated with the LSM tree is divided up into a number of shards. A key range of an LSM tree may refer to a range starting from the lowest key to the highest key in the LSM tree. In the example of FIG. 9, the lowest key is 1 while the highest key is 820. In order to determine a key range of an LSM tree, a compute resource in charge of performing the compaction may be configured to examine a catalogue file or an index table associated with the LSM tree. It should be noted that, in certain embodiments, this compute resource may be a host or a virtual machine.

Based on a read of the index table or the catalogue file, the compute resource is able to determine the lowest and the highest keys. This can be done because the catalogue file already records the key range associated with each SSTable. In another example, the compute resource may instead read all the SSTables in the LSM tree to find the key range. Once the key range is determined, the compute resource may be configured to divide up the key range into different sub-key ranges based on the number of shards, where each sub-key range (e.g., a subset of keys from the keys in the key range) corresponds to one of the number of shards. As described above, each sub-key range or boundaries for each shard may be determined based on the distribution of the key in the last level (e.g., level L2 in this example) of the LSM tree in some embodiments.

For example, in the example of FIG. 9, a computing device may first calculate, as described above with reference to FIG. 8, the number of shards to be 3. Based on the distribution of keys in L2, the computing device may divide the key range of 1-820 up to three sub-key ranges, each covering a different sub-range of keys including 1-400, 401-550, and 551-820. It should be noted that in the example of FIG. 9, the different boundaries associated with different shards do not comprise the same range of keys. For example, the first pair of boundaries assigned to the first shard covers a range of 400 keys (1-400), while the second pair of boundaries assigned to the second shard covers 150 keys (401-550), and the third pair of boundaries assigned to the third shard covers only 270 keys (551-820). This is because of the keys stored in the in the last level (e.g., L2) of the LSM tree may not be evenly distributed among the range of keys. For example, the amount of data keys each of the three pair of boundaries covers may be substantially equal to 33.3% of the total data stored in L2 (e.g., since the number of shards is determined to be 3). As described above, however, the pair of boundaries may be selected, such that each pair may cover the same or almost the same number of keys.

After determining the boundaries, each one or more shards may be assigned to a different merging entity to perform the compaction process in parallel with the other merging entities. For example, based on the availability of resources and other factors, shards 1 and 2 may be assigned to a first merging entity, while shard 3 is assigned to a second merging entity, while in other embodiments, each one of the shards may be assigned to a different merging entity.

As described above, in some embodiments, the shards boundaries may be readjusted based on the occurrence of an event. As an example, a balancing process may periodically check the sizes of the shards of the LSM tree and if the size of at least one of the shards has reached or past a threshold, the process may readjust the boundaries of the shards with new key values.

Figure 10:
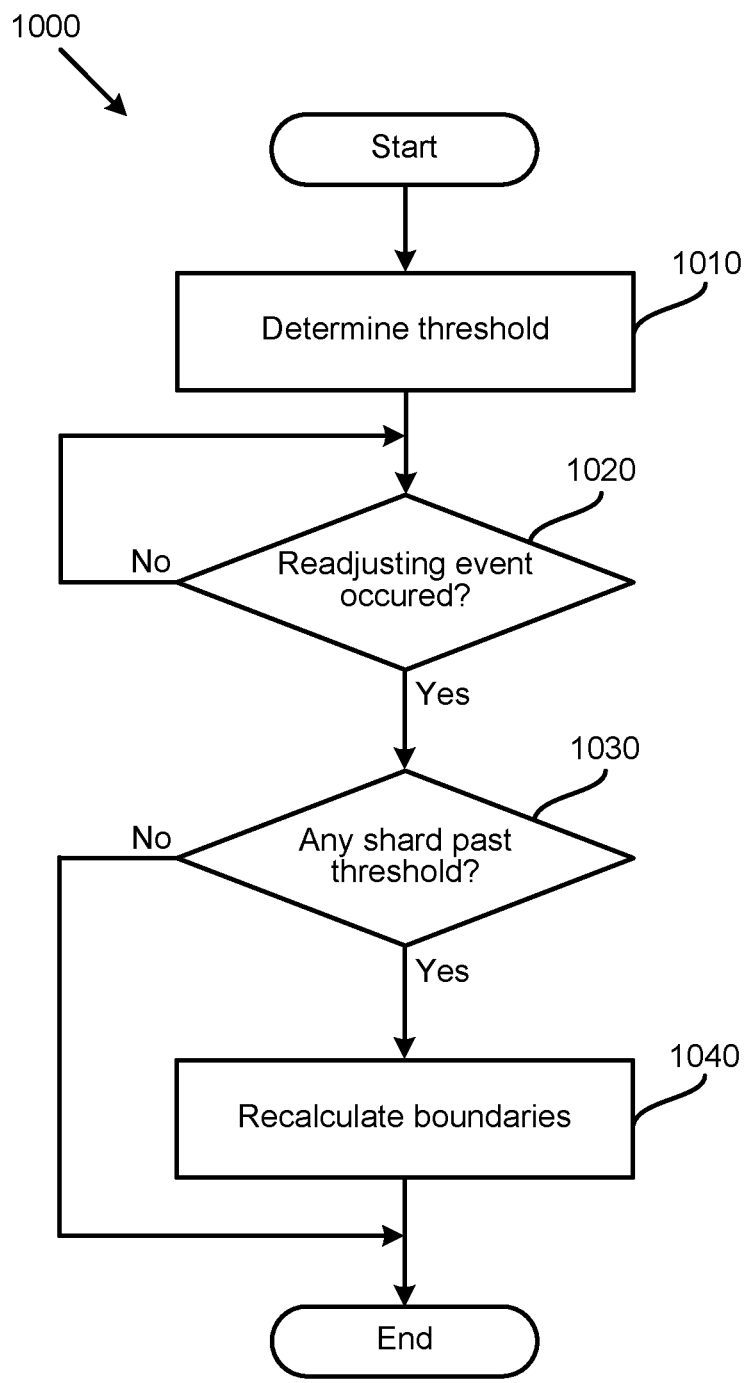
FIG. 10 is a flowchart illustrating a method (or process) for readjusting boundaries of the shards based on the occurrence of an event, according to an example embodiment of the present application.

FIG. 10 is a flowchart illustrating a method (or process) 1000 for readjusting boundaries of the shards based on the occurrence of an event, according to an example embodiment of the present application. Process 1000 may be performed by a physical or virtual computing device in charge of performing the compaction. For example, in some embodiments, the computing device may be a host or a VCI running on a host. If the aspects described herein are utilized in connection with a hybrid architecture, the computing device, in some embodiments, may be operating within an on-premise datacenter, such as datacenter 102 and, in certain other embodiments, it may operate within a public cloud computing system.

Process 1000 may start by determining, at 1010, a threshold based on which the boundaries of the shards have to be readjusted. In some embodiments, the threshold may be determined, for example, as a percentage of the size of the LSM tree, or the size of the last level of the LSM tree. In some embodiments, this percentage may also depend on the size of shards. For example, if each shard is assigned 10% of the total size of the last level of the tree, the threshold may be determined to be 2% of the total size of the last level. In other embodiments, the threshold may be determined based on other factors.

After determining the threshold, process 1000 may determine, at 1020, whether a readjusting event has occurred. The readjusting event may include passage of a time interval or other events. If no adjusting event has occurred, the process may return to 1020 to make the determination. If process 1000 determines that a readjusting event has occurred, the process may determine, at 1030, whether any shard boundaries need readjustment. For example, process 1000 may check every shard's size to determine whether it has changed by at least the determined threshold. If process 1000 determines that none of the shards has changed by at least the determined threshold, the process may end. On the other hand, if process 1000 determines that at least one of the shards' boundaries needs readjustment, the process may recalculate, at 1040, the boundaries for the shards (e.g., as described above with reference to FIGS. 8 and 9) and assign the new boundaries to the shards. In some embodiments, process 1000 may adjust the boundaries for only a subset of shards and not all of them. For example, if only one shard's size has changed by at least the threshold, the process may adjust the boundaries for that shard and one or both of its neighboring shards. This way, the boundaries for each one of the shards does not have to be calculated each time only one shard needs readjustment. After adjusting the boundaries for all or a subset of the shards, the process may end.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for managing data associated with objects stored in a cloud storage, comprising:
receiving, at a first compute node, first data associated with an object stored in the cloud storage, the first compute node being one of a plurality of compute nodes that store data associated with different objects as storage objects in a log-structured merging (LSM) tree data structure;
assigning, by the first compute node, a first unique name to a first storage object associated with the first data, the first unique name comprising a combination of at least an identifier identifying the first compute node and a first incremental local value;
storing the first storage object in a first level (L0) of the LSM tree data structure;
receiving, at the first compute node, second data associated with the object;
assigning, by the first compute node, a second unique name to a second storage object associated with the second data, the second unique name comprising a combination of at least the identifier identifying the first compute node and a second incremental local value that is equal to the first incremental local value incremented; and
storing the second storage object in the L0 of the LSM tree data structure.

2. The method of claim 1, wherein a storage object comprises a sorted string table (SSTable) having at least one key that maps to a value, wherein each compute node in the plurality of compute nodes is assigned a different range of keys to store in SSTables of the LSM tree data structure.

3. The method of claim 1, wherein a second compute node in the plurality of compute nodes stores a third storage object in the LSM tree data structure by:
assigning a third unique name to the third storage object, the third unique name comprising a combination of at least a second identifier identifying the second compute node and a third incremental local value; and
storing the third storage object in the L0 of the LSM tree data structure.

4. The method of claim 1, wherein when a size of the L0 reaches a threshold, a merging entity moves a plurality of storage objects stored in the L0, including the first and second storage objects, to a second level (L1) of the LSM tree data structure to make the L0 available for storing additional data, the moving comprising:
- determining that the first and second storage objects share the identifier indentifying the first compute node in their respective first and second unique names;
- based on the determining, merging the first and second storage objects into a merged storage object; and
- moving the merged storage object to the L1 of the LSM tree.

5. The method of claim 4, wherein the plurality of storage objects in the L0 further comprises a third storage object and a fourth storage object,
- wherein the first and second storage objects are within a first shard of a plurality of shards, and the third and fourth storage objects are within a second shard of the plurality of shards, and
- wherein when the size of the L0 reaches the threshold, the merging entity merges and moves storage objects that are within the first shard to the L1, and a second merging entity merges and moves storage objects that are within the second shard to the L1.

6. The method of claim 5, wherein the merging entity is assigned a first range of keys to merge and move to lower levels of the LSM tree data structure and the second merging entity is assigned a second range of keys to merge and move to the lower levels, and
- wherein at least one of the first and second ranges of keys is readjusted when a total size of data storage objects within a corresponding shard exceeds a threshold.

7. The method of claim 1, wherein the object comprises a virtual disk of a virtual machine and the first data associated with the object comprises metadata associated with the virtual disk, wherein the virtual disk is stored in the cloud storage in a log-structured file system (LFS) data structure, while the metadata is stored in the same or different cloud storage in the LSM tree data structure.

8. The method of claim 1, wherein receiving the first data associated with the object comprises receiving the first data from an uploader agent residing in a host machine of a datacenter, wherein the object comprises a virtual disk of a virtual machine executing on the host machine.

9. The method of claim 8, wherein a second datacenter retrieves data of the virtual disk from the cloud storage and the first storage object from the LSM tree data structure to recover and run the virtual machine in case of a failure in the datacenter.

10. A non-transitory computer readable medium comprising instructions that, when executed by one or more processors of a computing system, cause the computing system to perform a method for managing data associated with objects stored in a cloud storage, the method comprising:
- receiving, at a first compute node, first data associated with an object stored in the cloud storage, the first compute node being one of a plurality of compute nodes that store data associated with different objects as storage objects in a log-structured merging (LSM) tree data structure;
- assigning, by the first compute node, a first unique name to a first storage object associated with the first data, the first unique name comprising a combination of at least an identifier identifying the first compute node and a first incremental local value;
- storing the first storage object in a first level (L0) of the LSM tree data structure;
- receiving, at the first compute node, second data associated with the object;
- assigning, by the first compute node, a second unique name to a second storage object associated with the second data, the second unique name comprising a combination of at least the identifier identifying the first compute node and a second incremental local value that is equal to the first incremental local value incremented; and
- storing the second storage object in the L0 of the LSM tree data structure.

11. The non-transitory computer readable medium of claim 10, wherein a storage object comprises a sorted string table (SSTable) having at least one key that maps to a value, wherein each compute node in the plurality of compute nodes is assigned a different range of keys to store in SSTables of the LSM tree data structure.

12. The non-transitory computer readable medium of claim 10, wherein when a size of the L0 reaches a threshold, a merging entity moves a plurality of storage objects stored in the L0, including the first and second storage objects, to a second level (L1) of the LSM tree data structure to make the L0 available for storing additional data, the moving comprising:
- determining that the first and second storage objects share the identifier identifying the first compute node in their respective first and second unique names;
- based on the determining, merging the first and second storage objects into a merged storage object; and
- moving the merged storage object to the L1 of the LSM tree.

13. The non-transitory computer readable medium of claim 12, wherein the plurality of storage objects in the L0 further comprises a third storage object and a fourth storage object,
- wherein the first and second storage objects are within a first shard of a plurality of shards, and the third and fourth storage objects are within a second shard of the plurality of shards, and
- wherein when the size of the L0 reaches the threshold, the merging entity merges and moves storage objects that are within the first shard to the L1, and a second merging entity merges and moves storage objects that are within the second shard to the L1.

14. A computer system, comprising:
a memory; and
a processor coupled to the memory, the processor being configured to:
- receive, at a first compute node, first data associated with an object stored in the cloud storage, the first compute node being one of a plurality of compute nodes that store data associated with different objects as storage objects in a log-structured merging (LSM) tree data structure;
- assign, by the first compute node, a first unique name to a first storage object associated with the first data, the first unique name comprising a combination of at least an identifier identifying the first compute node and a first incremental local value;
- store the first storage object in a first level (L0) of the LSM tree data structure;
- receive, at the first compute node, second data associated with the object;
- assign, by the first compute node, a second unique name to a second storage object associated with the second data, the second unique name comprising a combination of at least the identifier identifying the first compute node and a second incremental local value that is equal to the first incremental local value incremented; and store the second storage object in the LO of the LSM tree data structure.

15. The computer system of claim 14, wherein a storage object comprises a sorted string table (SSTable) having at least one key that maps to a value, wherein each compute node in the plurality of compute nodes is assigned a different range of keys to store in SSTables of the LSM tree data structure.

16. The computer system of claim 14, wherein the object comprises a virtual disk of a virtual machine and the first data associated with the object comprises metadata associated with the virtual disk, wherein the virtual disk is stored in the cloud storage in a log-structured file system (LFS) data structure, while the metadata is stored in the same or different cloud storage in the LSM tree data structure.

17. The computer system of claim 14, wherein receiving the first data associated with the object comprises receiving the first data from an uploader agent residing in a host machine of a datacenter, wherein the object comprises a virtual disk of a virtual machine executing on the host machine.

18. The computer system of claim 17, wherein a second datacenter retrieves data of the virtual disk from the cloud storage and the first storage object from the LSM tree data structure to recover and run the virtual machine in case of a failure in the datacenter.

* * * * *